United States Patent [19]

Takahasi et al.

[11] 4,337,498
[45] Jun. 29, 1982

[54] SMALL IGNITION DEVICE COMPRISING STRING-LIKE SILICON CARBIDE HEATING ELEMENT AFFIXED TO TERMINAL SUPPORTS

[75] Inventors: Masayosi Takahasi, Kasugai; Sadatosi Nakazono, Nagoya; Yoshio Nakamura, Sagamihara, all of Japan

[73] Assignee: Tokai Konetsu Kogyo Co., Ltd., Tokyo, Japan

[21] Appl. No.: 184,421

[22] Filed: Sep. 5, 1980

Related U.S. Application Data

[62] Division of Ser. No. 5,030, Jan. 22, 1979, abandoned.

[30] Foreign Application Priority Data

Jan. 27, 1978 [JP]  Japan ................................. 53/8105

[51] Int. Cl.³ .............................................. F23Q 7/00
[52] U.S. Cl. .................................. 361/266; 219/270; 219/523; 260/448 R; 431/258
[58] Field of Search ............... 219/270, 523, 552, 553; 361/264, 265, 266; 260/448.2 D; 264/65, 176 F; 431/66, 262, 258, 263; 106/44; 338/326, 330, 332; 13/25, 31

[56] References Cited

U.S. PATENT DOCUMENTS

| | | | |
|---|---|---|---|
| 3,139,558 | 6/1964 | Lindberg | 361/266 |
| 3,372,305 | 3/1968 | Mikulec | 219/270 X |
| 3,393,038 | 7/1968 | Burkhalter et al. | 261/265 X |
| 3,454,345 | 7/1969 | Dyre | 431/66 |
| 3,569,787 | 3/1971 | Palmer | 219/270 X |
| 3,810,734 | 5/1974 | Willson | 431/258 |
| 3,829,739 | 8/1974 | Anderson et al. | 361/264 |
| 3,859,500 | 1/1975 | Matys | 219/553 |
| 3,875,477 | 4/1975 | Fredriksson et al. | 361/264 |
| 4,052,430 | 10/1977 | Yajima | 260/448.2 D |
| 4,100,233 | 7/1978 | Yajima | 264/65 |
| 4,152,509 | 5/1979 | Yajima et al. | 528/4 |
| 4,220,600 | 9/1980 | Yajima et al. | 556/434 |

FOREIGN PATENT DOCUMENTS

| 486164 | 9/1952 | Canada | 361/266 |
|---|---|---|---|
| 2236078 | 3/1974 | Fed. Rep. of Germany | 264/65 |

OTHER PUBLICATIONS

Kornguth et al., "The Silicon Carbide Igniter", *Appliance Engineer*, vol. 7, No. 4 (1973), pp. 33–36.

Yajima et al., "SiC Bodies Sintered with Three-Dimensional Cross-Linked Polycarbosilane", *Ceramic Bulletin*, vol. 56, No. 12 (1977), pp. 1060–1063.

*Primary Examiner*—Volodymyr Y. Mayewsky
*Attorney, Agent, or Firm*—Frishauf, Holtz, Goodman & Woodward

[57] ABSTRACT

A small ignition device comprising a string-like silicon carbide heating element extending between and joining in electrical connection respective silicon carbide rod-like terminals. The heating element is joined to the terminals by an electrically conductive silicon joint. The string-like element has all cross-sectional dimensions between 0.05 mm and 2 mm and has a resistivity of between 0.01Ω·cm and 10Ω·cm whereby said heating element is heated to between about 1000° C. and 1300° C. in about 1 to 4 seconds after an electric current is connected thereto.

6 Claims, 3 Drawing Figures

SMALL IGNITION DEVICE COMPRISING STRING-LIKE SILICON CARBIDE HEATING ELEMENT AFFIXED TO TERMINAL SUPPORTS

This is a division of application Ser. No. 5,030, filed Jan. 22, 1979, now abandoned.

BACKGROUND OF THE INVENTION

This invention relates to a string-like silicon carbide heating element circular or rectangular in cross section, more particularly, to a method of producing a string-like silicon carbide heating element circular or rectangular in cross section, which is suitable for use as an ignition means of a combustor which burns natural gas, petroleum, etc.

Resistance heating elements widely used nowadays include a nonmetallic element and a metallic element like a heating wire. A string-like heating element is widely known to the public when it comes to a metallic heating element such as nichrome or kanthal alloy. But, a string-like heating element has not yet been developed when it comes to a nonmetallic heating element such as silicon carbide.

The conventional method of producing a silicon-carbide heating element comprises the steps of adding an inorganic binder to a powdered α-silicon carbide, shaping the mixture into a rod or a hollow cylinder, and sintering the shaped body at temperature higher than 2,000° C. Naturally, the resultant heating element is formed mainly of α-silicon carbide. Such a conventional silicon carbide heating element in the form of a rod or hollow cylinder is about 6 mm or more in diameter. As a matter of fact, a heating element of this type having a diameter smaller than about 6 mm is unknown to the public. The large diameter mentioned leads to a low resistance of the heating element, through the conventional silicon carbide heating element has a resistivity of about 0.03 to 0.15 Ω·cm, resulting in that it is impossible to connect the heating element directly to a household power source of 100 V or to a 12 V cell. Under the circumstances, it is customary to use a metallic heating element for forming an ignition means of a small room heater utilizing the combustion of natural gas, petroleum, etc. On the other hand, the use of the conventional silicon carbide heating element is restricted to a field such as industrial electric furnace.

SUMMARY OF THE INVENTION

An object of this invention is to provide a method of producing a string-like silicon carbide heating element, for example, circular or rectangular in cross section, suitable for use as a small ignition means.

According to this invention, there is provided a method of producing a string-like silicon carbide heating element, comprising the steps of shaping an organosilicon high molecular compound containing silicon and carbon into a string-like mass having a diameter or width of 0.05 to 2.0 mm, and sintering the shaped mass at 1,000° C. to 1,800° C. under vacuum or a nonoxidizing atmosphere.

DETAILED DESCRIPTION OF THE INVENTION

Figure 1A:
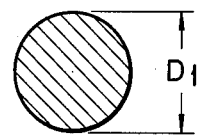
FIGS. 1A and 1B are cross sectional views each showing a string-like silicon carbide heating element according to this invention.

Any type of organosilicon high molecular compound can be used in this invention, provided the compound contains at least silicon and carbon. Suitable compounds include, for example, polysilane and polysiloxane having a carbon-containing side chain such as methyl group; polycarbosilane having the skeletal structure formed of silicon and carbon; and polyborosiloxane having the carbon-containing side chain and a skeletal structure formed of silicon, boron and oxygen. These compounds may be calcined, if necessary, at 500° C. to 900° C. under a nonoxidizing atmosphere so as to adjust the molecular weight thereof to facilitate the subsequent operation of extrusion molding. It is possible to use these compounds singly or in the form of a mixture. It is also possible to use in this invention known organosilicon high molecular compounds containing silicon and carbon, for example polysilane and polysiloxane.

Among the organosilicon high molecular compounds exemplified above, polycarbosilane having the skeletal structure formed of silicon and carbon and a method of producing the same are known to the art. In particular, U.S. Pat. Nos. 4,052,430 and 4,117,057 both granted to Yajima et al. describe in detail polycarbosilanes. Typical methods of producing the polycarbosilanes disclosed in these U.S. patent specifications utilize polymerization of the substances listed below by heating, irradiation, and adding a catalyst:

(1) Compounds having only Si—C bond;

Silahydrocarbons represented by, for example, the following general formulae:

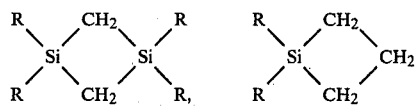

where "R" is either alkyl group or aryl group.

(2) Compounds having both Si—C and Si—H bonds;

Organosilanes represented by, for example, the following general formula:

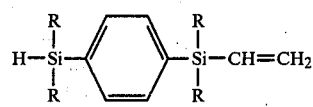

where "R" is either alkyl group or aryl group.

(3) Compounds having Si—Hal bond;

Organohalogensilanes represented by, for example, the following general formula:

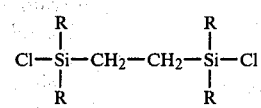

where "R" is either alkyl group or aryl group.

(4) Compounds having a Si—Si bond; represented by, for example, the following general formula:

where "R" is either alkyl group or aryl group.

In the present invention, it is preferred to use polycarbosilanes which are easy to produce and have only a small weight decrease after the subsequent step of sintering. Particularly suitable for this invention is polysilapropylene of the following chemical structure:

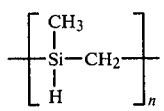

U.S. patent applications Ser. Nos. 835,373, now U.S. Pat. No. 4,152,509, and 953,513, now U.S. Pat. No. 4,220,600, filed on Sept. 21, 1977 and Oct. 23, 1978, respectively, by Yajima et al. disclose in detail polycarbosilane which contains siloxane bonds, which is suitable for use in this invention. Said polycarbosilane which contains siloxane bonds is produced by mixing polysilane and a small amount of polyborosiloxane and heating the mixture in an atmosphere inert to the reaction.

Among the polyborosiloxanes, those having phenyl groups as the side chain attached to at least some of the silicon atoms included in the skeletal structure are suitable for use in producing said polycarbosilane which contains siloxane bonds. For producing the polyborosiloxanes of this type, it is convenient to employ the dehydrochlorination-condensation reaction between diorganodichlorosilane and boric acid as exemplified below:

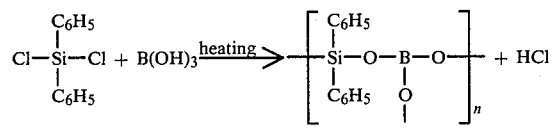

Polyborodiphenylsiloxane is most suitable for use in this invention among the polyborosiloxanes.

The organesilicon high molecular compound used in this invention can be in the form of from a liquid to a solid depending on the molecular weight thereof. When in a liquid form, the compound may be calcined at 500° C. to 900° C. under a nonoxidizing atmosphere so as to convert the liquid compound into a viscous, calcined material for use in this invention. Likewise, the liquid compound may be mixed with a viscous compound, or a powdery material of a solid compound. When in the form of a viscous form, the organosilicon high molecular compound may be used as it is or may be calcined at 500° C. to 900° C. under a nonoxidizing atmosphere for use in this invention. When in a solid form, the compound may be dissolved in a suitable solvent to provide a viscous material. Likewise, the solid compound ground into a fine powder may be mixed with a suitable organic binder solution and kneaded to provide a viscous material suitable for use in this invention. The solvents suitable for this invention include, for example, benzene, toluene, xylene, hexane, and ether. On the other hand, the suitable organic binders include, for example, polyvinylalcohol, methylcellulose, carboxymethylcellulose, and starch. The raw material, i.e., molding material, containing the organosilicon high molecular compound thus adjusted is subjected to extrusion molding by a conventional means.

It is possible to add, if necessary, a powdery silicon, a powdery silicon carbide, a powdery silicon dioxide, a powdery carbon or a mixture thereof to the organosilicon high molecular compound such as polycarbosilane or polyborosiloxane which has been adjusted to be suitable for the subsequent extrusion molding step.

Figure 1B:
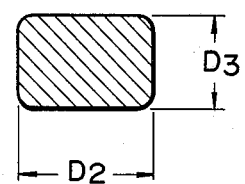

The molding raw material containing as the main component the organosilicon high molecular compound thus adjusted is subjected to extrusion molding by conventional means so as to obtain a string-like extrudate, for example, circular or rectangular in cross section as shown in FIGS. 1A and 1B. Incidentally, each of the diameter $D_1$ shown in FIG. 1A and the width $D_2$, $D_3$ shown in FIG. 1B should range between 0.05 mm and 2.0 mm in the present invention. The extrudate thus obtained is sintered at 1,000° C. to 1,800° C. under a nonoxidizing atmosphere such as nitrogen or argon so as to obtain a string-like silicon carbide heating element circular or rectangular in cross section.

The organosilicon high molecular compound such as polycarbosilane is thought to be theremally decomposed in the sintering step to liberate excessive carbon, hydrogen, etc., resulting in reaction between carbon and silicon to provide silicon carbide.

It is important to note that the diameter or width of the silicon carbide heating element of this invention should range between 0.05 mm and 2.0 mm. The molding raw material of the present invention containing the organosilicon high molecular compound such as polycarbosilane and polyborosiloxane is very suitable for extrusion molding. In other words, the particular molding raw material used in this invention has rendered it possible to produce by extrusion molding a string-like silicon carbide heating element markedly smaller in cross sectional area than the conventional silicon carbide heating element. It should be noted, however, that the heating element should be at least 0.05 mm, preferably, at least 0.2 mm, in diameter or width in order to enable the heating element to exhibit sufficient heat resistance and mechanical strength. On the other hand, the heating element having a diameter or width larger than 2.0 mm is insignificant because this invention is intended to provide a small silicon carbide heating element.

The string-like silicon carbide heating element of this invention should have a resistivity of 0.01 to 10 Ω·cm and should be operable at a power of 1 to 20 W. The resistivity can be controlled without difficulty within the range mentioned above by adding a suitable amount of an impurity such as boron or aluminum to the raw material. Likewise, the heating element can be made operable at the above-noted power by properly changing the cross sectional area and the length of the heating element in accordance with the resistivity thereof. Naturally, the string-like silicon carbide heating element of this invention is advantageous in power consumption over the conventional silicon carbide heating element because the heating element of this invention is operable at a power of as low as 1 to 20 W.

The string-like silicon carbide heating element of this invention in a linear form is acceptable, but the heating element in a spiral or arched form is more desirable.

Naturally, the heating element in a spiral or arched form is advantageous over the element in a linear form in the capability of absorbing the expansion and shrinkage accompanying the ignition and extinguishment of the heating element, respectively. Further, the heating element in a spiral or arched form is larger in the surface area than that in a linear form and, thus, is capable of more effectively igniting the gas, petroleum, etc.

Figure 2:
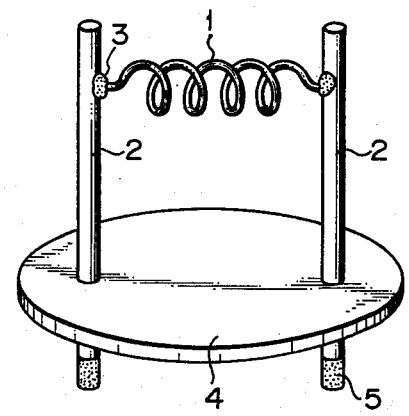
FIG. 2 is a perspective view of a small ignition device comprising a spirally shaped silicon carbide heating element according to this invention.

FIG. 2 shows a small ignition device employing invented the silicon carbide heating element of this invention. It is seen that a string-like silicon carbide heating element 1 in a spiral form is bonded at the ends to rod-like terminals 2, 2 by using a joining material 3. It is preferred to use a silicon carbide rod of a large diameter for forming the terminal 2. These terminals extend through an insulator 4 and are plated with a conductive metal layer 5 at the ends opposite to the portions to which the silicon carbide heating element 1 is bonded. In general, the heating element 1 is bonded to the terminals 2 by using a fused metallic silicon as the joining material.

As described above in detail, the string-like silicon carbide heating element of this invention, which is circular or rectangular in cross section, is markedly smaller in cross sectional area and is operabel at a markedly smaller power than the conventional silicon carbide heating element. As a matter of fact, the heating element of this invention can be connected directly to the power source of 100 V available to common homes without using any auxiliary equipment like a transformer. It is also important to note that the heating element of this invention is prominently lower in resistance around room temperatures than the conventional silicon carbide heating element, resulting in that the invented heating element can be heated to a desired temperature in an extremely short time. For example, the invented heating element is heated to about 1000° C. to 1,300° C. in only about 1 to 4 seconds after the ignition device was turned on. The heating speed mentioned is substantially equal to that of a metallic heating wire.

An additional merit to be noted is that the heating element of this invention is excellent in mechanical strength, heat resistance and corrosion resistance because the heating element consists essentially of silicon carbide. Specifically, the invented heating element can be used stably at temperatures up to about 1,400° C. for a long period of time even under a corrosive atmosphere.

As described above in detail, this invention provides a string-like silicon carbide heating element circular or rectangular in cross section and enabled to exhibit the merits inherent in both the conventional silicon carbide heating element and metallic heating wire.

Described in the following are Examples of this invention.

EXAMPLE 1

Polyborodiphenylsiloxane was calcined at 600° C. under nitrogen atmosphere. 70 parts by weight of the calcined material was mixed with 30 parts by weight of polysilapropylene. After the mixture was sufficiently grounded and mixed, 3 parts by weight of polyvinylalcohol was added to the mixture for kneading the mixture so as to prepare a molding raw material. The molding raw material thus prepared was subjected to extrusion molding so as to prepare a string-like extrudate having a diameter of 0.5 mm and a length of 40 mm. After being dried at 120° C., the extrudate was sintered at 1,300° C. under nitrogen atmosphere, thereby obtaining a silicon carbide heating element circular in cross section.

The resultant heating element was cut into a desired length and used for forming an ignition device as shown in FIG. 2. The ignition device was found to be capable of continuing to release heat of 1,000° C. at a power of about 15 W. Further, the change in resistance of the heating element was within about 3% after the ignition device has been kept at 1,000° C. under air atmosphere for 100 hours.

EXAMPLE 2

A mixture consisting of 50 parts by weight of polysilapropylene, 50 parts by weight of silicon carbide powder and about 4 parts by weight of polyvinylalcohol was sufficiently powdered and kneaded so as to prepare a molding raw material, followed by subjecting the molding raw material thus prepared to extrusion molding, thereby obtaining a string-like extrudate rectangular in cross section. Specifically, the extrudate was sized at 0.5 mm in width and 40 mm in length. After being dried, the extrudate was sintered at 1,300° C. so as to obtain a silicon carbide heating element rectangular in cross section. The resultant heating element was found to be substantially equal in properties to that obtained in Example 1.

EXAMPLE 3

Polyborodiphenylsiloxane was calcined at 600° C. under nitrogen atmosphere. 55 parts by weight of the calcined material was mixed with 45 parts by weight of silicon powder. After the mixture was sufficiently ground and mixed, about 3 parts by weight of polyvinylalcohol was added to the mixture for kneading the mixture so as to prepare a molding raw material. The molding raw material thus prepared was subjected to extrusion molding so as to prepare a string-like extrudate circular in cross section. Specifically, the extrudate was sized at 0.5 mm in diameter and 40 mm in length. After being dried, the extrudate was sintered at 1,300° C. under argon atmosphere, thereby obtaining a string-like silicon carbide heating element circular in cross section. The resultant heating element was found to be substantially equal in properties to that obtained in Example 1.

EXAMPLE 4

Polysilapropylene was calcined at 600° C. under nitrogen atmosphere. 70 parts by weight of the calcined material was mixed with 30 parts by weight of polysilapropylene which has not been calcined. After the mixture was sufficiently ground and mixed, about 3 parts by weight of polyvinylalcohol was added to the mixture for kneading the mixture so as to prepare a molding raw material. The molding raw material thus prepared was subjected to extrusion molding so as to prepare a string-like extrudate circular in cross section. Specifically, the extrudate was 0.05 mm in diameter and 15 mm in length. After being dried at about 120° C., the extrudate was sintered at 1,300° C. under nitrogen atmosphere, thereby obtaining a string-like silicon carbide heating element circular in cross section.

An ignition device as shown in FIG. 2 was prepared by using the resultant heating element. When electric power of 6.3 W, i.e., 90 V×70 mA, was conducted through the ignition device, the surface temperature of the heating element was raised to reach 1,000° C. Further, the change in resistance of the heating element was within about 3% after the temperature of 1,000° C. mentioned above had been kept for 200 hours.

What we claim is:

1. A small ignition device, comprising
a pair of electrically conductive silicon carbide rod-like terminals, and
a string-like silicon carbide heating element extending between and having respective ends joined and electrically connected by fused electrically conductive silicon to a respective rod-like terminal for supporting said string-like element, and
support means supporting said rod-like terminals spaced apart from each other, and electrically insulated from each other, said rod-like terminals extending from said support means to support said string-like silicon carbide heating element spaced from said support means,
said string-like element having all cross-sectional dimensions between 0.5 mm and 2.0 mm and having a resistivity of between $0.01\Omega\cdot cm$ and $10\Omega\cdot cm$ whereby said heating element is heated to between about 1000° C. and 1300° C. in about 1 to 4 seconds after an electric current is connected thereto.

2. The device of claim 1 wherein said string-like element is in the shape of a spiral.

3. The device of claim 1 or 2 wherein said support means is an insulating base member, said terminals being connected to and extending from said base member and supporting said string-like element spaced from said base member and said heating element is joined to each of said respective rod-like terminals by a joint formed from fused metallic silicon.

4. The device of claim 1 or 2 wherein said rod like terminals are silicon carbide rods having a larger cross-sectional area than that of said string-like element.

5. The device of claim 3 wherein said rod like terminals are silicon carbide rods having a larger cross-sectional area than that of said string-like element.

6. The device of claim 5 wherein said rod like terminals extend through said base member in the direction away from said heating element and an end portion of each of said terminals extending through said base member is provided with a surface portion of a conductive metal.

* * * * *